(12) United States Patent
Morba

(10) Patent No.: US 11,778,107 B2
(45) Date of Patent: Oct. 3, 2023

(54) RETAIL PHOTO KIOSK ACCESS SYSTEM

(71) Applicant: Kodak Alaris Inc., Rochester, NY (US)

(72) Inventor: Michael Morba, Rochester, NY (US)

(73) Assignee: KODAK ALARIS INC., Rochester, NY (US)

( * ) Notice: Subject to any disclaimer, the term of this patent is extended or adjusted under 35 U.S.C. 154(b) by 0 days.

(21) Appl. No.: 16/942,068

(22) Filed: Jul. 29, 2020

(65) Prior Publication Data

US 2021/0037147 A1  Feb. 4, 2021

Related U.S. Application Data

(60) Provisional application No. 62/880,343, filed on Jul. 30, 2019.

(51) Int. Cl.
*G06F 15/00* (2006.01)
*H04N 1/00* (2006.01)

(52) U.S. Cl.
CPC ..... *H04N 1/00177* (2013.01); *H04N 1/00145* (2013.01); *H04N 1/00164* (2013.01); *H04N 1/00167* (2013.01); *H04N 1/00188* (2013.01)

(58) Field of Classification Search
CPC ........... H04N 1/00177; H04N 1/00145; H04N 1/00164; H04N 1/00167; H04N 1/00188
USPC ........................................ 358/1.15
See application file for complete search history.

(56) References Cited

U.S. PATENT DOCUMENTS

| 10,728,400 B2 * | 7/2020 | Curry | ................ H04N 1/00169 |
| 2002/0057492 A1 | 5/2002 | Yoshino | |
| 2013/0188063 A1 * | 7/2013 | Cameron | ........... H04N 1/00188 348/207.1 |
| 2016/0078434 A1 * | 3/2016 | Huxham | ............. G06Q 20/382 705/71 |
| 2017/0017145 A1 | 6/2017 | Park et al. | |

FOREIGN PATENT DOCUMENTS

EP          2367147 A1          9/2011

OTHER PUBLICATIONS

Anonymous: "Voice user interface—Wikipedia", Apr. 24, 2019 (Apr. 24, 2019), XP055735850, Retrieved from the Internet: URL:https://en.wikipedia.org/w/index.php? title=Voice_user_interface&oldid=893968910 [retrieved on Oct. 1, 2020].
International Preliminary Report on Patentability dated Feb. 10, 2022 in PCT/US2020/044004.

* cited by examiner

*Primary Examiner* — Mark R Milia
(74) *Attorney, Agent, or Firm* — HOGAN LOVELLS US LLP

(57) ABSTRACT

Disclosed herein are embodiments for operating a retail photo kiosk and establishing a dedicated access for a remote mobile device to the photo kiosk. Certain embodiments of the photo kiosk incorporate anchored connector cables to connect remote mobile devices to the photo kiosk. According to one embodiment, the photo kiosk detects when a remote mobile device is connected to the kiosk via an anchored connector cable. Upon receiving user information, the photo kiosk generates and sends an access message comprising to the connected mobile device. Following the access message, the user may establish dedicated access to the photo kiosk through the mobile device, which allows the user to utilize and leverage photo processing features of the kiosk.

12 Claims, 8 Drawing Sheets

RETAIL PHOTO KIOSK ACCESS SYSTEM

CROSS-REFERENCE TO RELATED APPLICATIONS

This application is a non-provisional of and claims priority to U.S. provisional application No. 62/880,343, which was filed on Jul. 30, 2019.

FIELD OF THE INVENTION

This invention pertains to a retail photo kiosk access system, which enables users to connect mobile devices to retail photo kiosks in a unique manner. The system facilitates and initiates personalized, streamlined, and efficient workflow between the user and the kiosk. The access system further pertains to the rapid and secure exchange of data between a user's mobile device and photo kiosks to facilitate photo editing and submission, creation, and fulfillment of personalized photo product.

BACKGROUND OF THE INVENTION

The proliferation of low cost and high quality digital capture devices such as digital cameras and smart phones has resulted in vast collections of individual and shared digital imagery, both still images and video. Consumers frequently turn to retail providers to create and fulfill orders for various types of photo products (e.g., photo books, calendars, collages, single prints etc.) that incorporate images from the consumers' vast collections of images. Retailers have recently addressed this consumer demand by placing photo kiosks in stores to allow a more autonomous customer experience. Generally, such retail photo kiosks provide consumers with an easy way to: have their important personal photographs printed, make photo products and photo gifts, and share individual photos and photo products, in hard or soft copy forms, with friends and families.

With the development, advancement, and popularity of smartphones, the obstacles and costs of recording, storing, and sharing personal still and video images have all but been eliminated, resulting in in vast libraries of personal content stored directly on the user's smartphone and/or on a remote network storage (e.g., cloud storage) that is accessible via users' mobile devices. Frequent, long-term users of retail photo kiosks who once used digital cameras, SD cards, camera phones, and USB storage devices have grown accustomed to plugging their camera, phone, card or USB memory device, or another image source into the photo kiosk. More recently, phone-based applications (or "apps") have been developed and used as an alternative means for accessing and connecting to retail photo kiosks.

However, convincing users to download and learn a new app for a limited, specific use requires a costly communications effort in a market with thousands of free and paid apps. In addition, it is a costly effort to create an app that must be tailored to be compatible with numerous mobile device types, mobile device operating systems, and variable photo kiosk hardware. It has thus been discovered that consumers prefer physical connection methods over wireless connection methods.

There are many reasons why this is consumer preference. For example, such methods leverage existing consumer behaviors. Current mobile devices with thousands of locally and/or remotely stored images can take many minutes just to transfer even thumbnail renderings of said stored images to the kiosk wirelessly. Users may also prefer not to have to download and learn how to operate a new app. And, some users may have privacy concerns transmitting data wirelessly to a third-party retail photo kiosk to which other customers connect. Another connection method known in the art involves the use of a QR code, which may be printed on the kiosk or displayed on the kiosk's display screen. To make use of this connection method, however, the user must have a mobile device that supports and enables QR code reading.

Accordingly, there remains a need in the art for a system that is capable of leveraging physical connection (i.e., "plug-in") behavior, that does not require a special app, that does not require modifications to privacy settings or permissions status by the user or the photo kiosk, that does not require third-party intervention (e.g., a store clerk), and that provides ready access to users' vast collections of still and video images. The various embodiments described herein fulfill these and other needs in the art.

SUMMARY OF THE INVENTION

Embodiments of the present invention are directed to retail photo kiosk systems and methods of use. According to one embodiment, a method of accessing a retail photo kiosk comprises the kiosk providing a visible message and/or an audio message to a potential user via the user's mobile device. The message instructs the user to select an anchored connection cable that is appropriate for connecting the user's mobile device to the kiosk (there may be several types of connection cables connected to the kiosk). The kiosk, via its processor system, monitors and detects when a user mobile device has been connected to any one of the connection cables. Once a connection is established and recognized by the kiosk, the kiosk, via its processor, provides a graphical user interface ("GUI") on a display associated with the photo kiosk. The kiosk then instructs the user to provide account information, contact information, or mobile device information via the display. Alternatively or additionally, the kiosk may provide a voice recognition input/output as the user interface. In such an embodiment, user interaction with the kiosk is done audibly—e.g., connection confirmation and exchange of contact information and/or mobile device information is provided audibly and processed by the kiosk.

In response the kiosk receiving the account information, contact information, or mobile device information, it sends, via the processor, a message (e.g., text or email) to the user. In certain embodiments the message may be provided to the user's mobile device including an internet hyperlink to connect the user's device to the retail photo kiosk via a wireless connection. In other embodiments, the message delivered to the user's mobile device may prompt the device to initiate an alert with instructions to the user to activate the hyperlink. Upon activating the hyperlink, the internet browser of the device launched, opening a browser window with a wireless internet connection to the retail photo kiosk. Once connected, the user may perform a plethora of functions, including, for example, photo editing, photo product creation and rendering, and submitting photo product orders for fulfillment.

DETAILED DESCRIPTION OF THE INVENTION

Embodiments of the present invention provide various configurations of retail photo kiosks and methods of using the same. The invention is inclusive of combinations of the aspects and features described herein. References to "a particular aspect" and the like refer to features that are present in at least one embodiment of the invention. Separate references to "an aspect" or "particular aspects" or the like do not necessarily refer to the same aspect or aspects; however, such aspects are not mutually exclusive, unless so indicated or as are readily apparent to one of skill in the art. It should be understood that the phrases "retail photo kiosk," "photo kiosk," and "kiosk" may be used interchangeably throughout and features described are equally applicable to any labeling.

Figure 1:
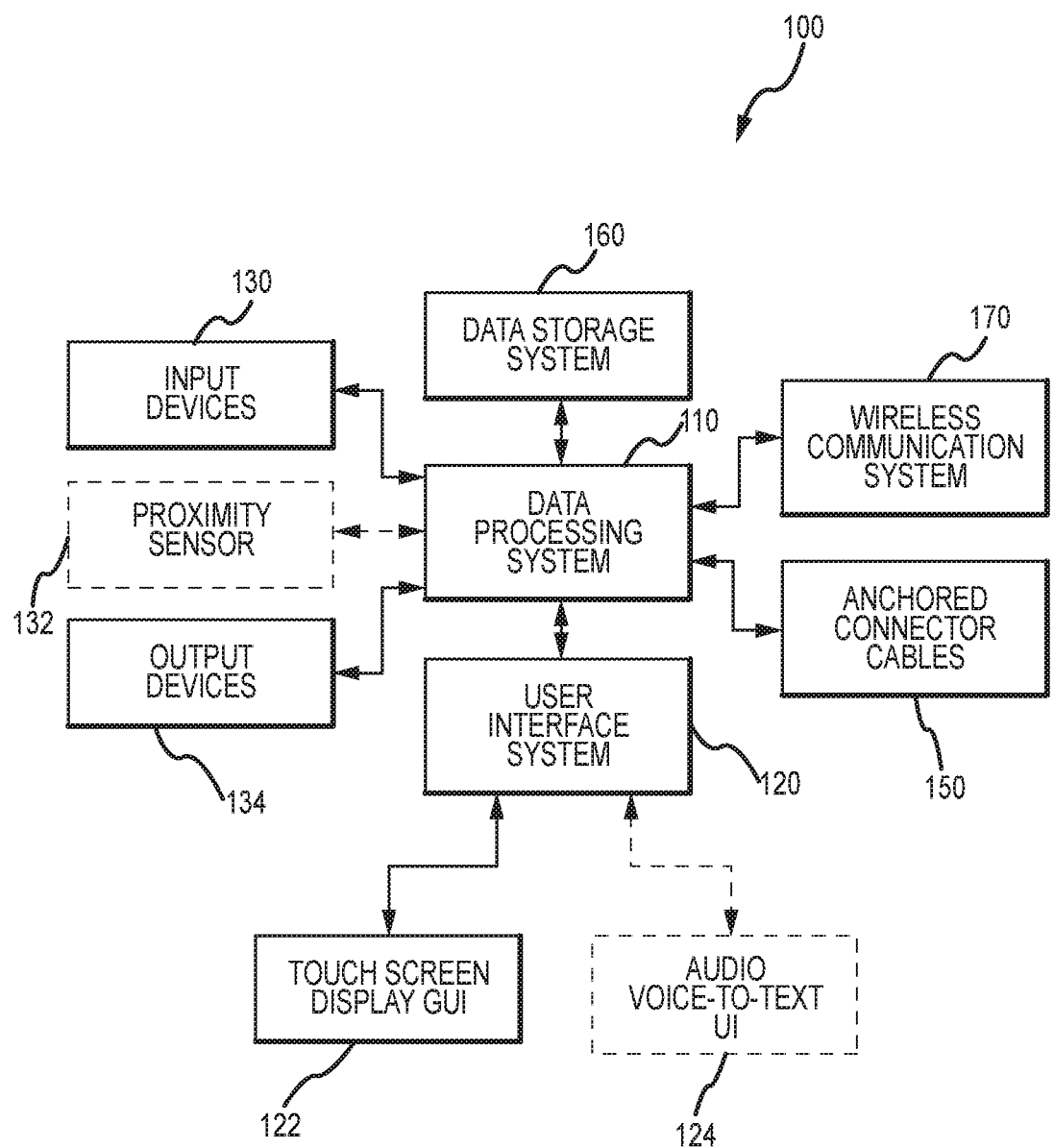
FIG. 1 is a schematic block diagram illustrating certain features of an embodiment of the photo kiosk system of the present invention.

FIG. 1 illustrates a schematic block diagram of an embodiment of a retail photo kiosk 100. Kiosk 100 comprises a central data processing system 110, which controls the operation of the kiosk and its associative features. The processing system 110 may comprise one or more central processing units ("CPUs" or "processors") known in the art (e.g., microprocessor(s)). Kiosk 100 also comprises a user interface system 120. User interface system 120 comprises a touch screen display 122 and/or an audio user interface 124. The touchscreen display 122 is an input device comprising a graphical user interface ("GUI") configured to enable users to interact directly with the display. The audio user interface 124 comprises a speaker and is configured to enable users to interact with kiosk 100 audibly, via voice commands. The audio user interface 124 may be configured with voice-to-text capabilities, which can translate outgoing audio messages and incoming audio (e.g., voice commands and responses from a user) into text. The text can be displayed on display 122 with the corresponding audio.

Kiosk 100 further comprises interfaces to enable connection with input devices 130 and output devices 134. Input devices 130 may include, but are not limited to, external hard drives, USB drives, and mobile devices (e.g., smartphones and tablets) that are connectable to kiosk 100, as well as disk-type media reader/writers such as DVD, Blu-ray, SD cards, and memory sticks, and other types of solid state data storage media. Output devices 134 may include, but are not limited to, various types of printers, such as ink jet printers, thermal printers, and panoramic printers, which can be housed within the physical structure of the kiosk 100 or remotely connected. In certain embodiments, output devices 134 may additionally comprise CD/DVD writers, USB memory stick reader/writer devices, and modems. In other embodiments, kiosk 100 may further comprise a proximity sensor 132, which can be any known sensor known in the art, including, but not limited to, a conductive sensor, a photoelectric sensor, a through-beam sensor, a retro-reflective sensor, an ultrasonic sensor, or a camera sensor. Proximity sensor 132 is configured to detect when users approach the kiosk 100. Upon detecting a user's arrival at kiosk 100, the sensor can transmit a signal to data processing system 110 to initiate an interactive session with the user (as described below).

Additionally, kiosk 100 comprises anchored connector cables 150. As mentioned above, input devices 130 are connectable to the kiosk 100. In certain embodiments, input devices 130 are connected to the kiosk 100 via the anchored connector cables 150. Accordingly, the anchored connector cables 150 may comprise a variety of types of connectors so that a variety of types of devices can be connected. For example connector cables 150 may be selected from the group consisting of: Type-A USB cables, Type-B USB cables, Type-C USB cables, mini-USB cables, micro-USB cables, and "Lightning" cables. Kiosk 100 also comprises a wireless communication system 170 to complement the anchored connector cables 150. Finally, the kiosk 100 may comprise a data storage system 160. Data storage system 160 may comprise one or more of the following: random-access memory (RAM), cache memory, or any other volatile storage device known in the art, as well as a hard disk, and cloud storage.

Figure 2:
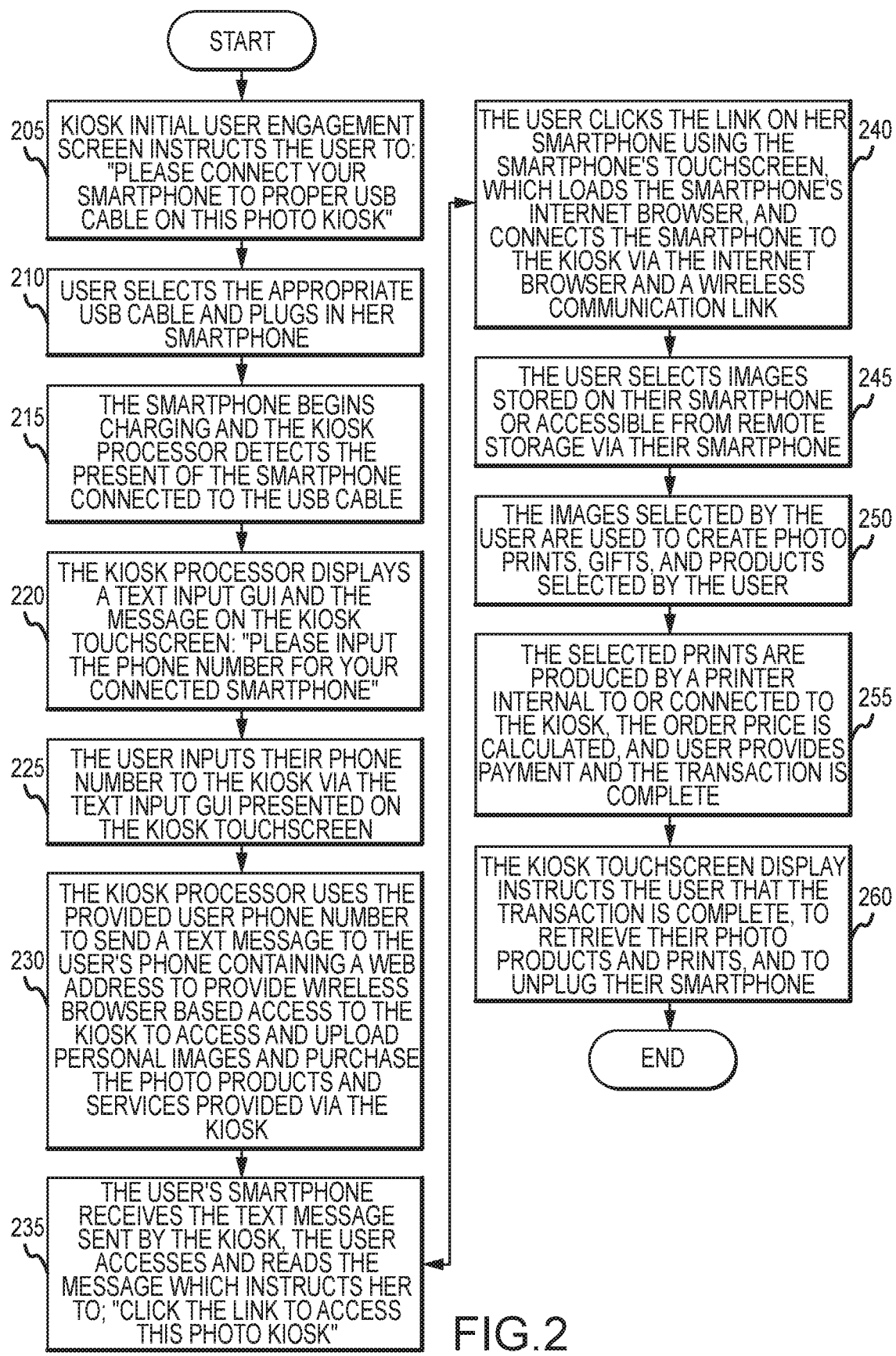
FIG. 2 is a flow diagram of a method for accessing a retail photo kiosk according to an embodiment of the present invention.

Retail photo kiosk 100 may be configured as desktop unit, a tabletop unit, or a free-standing terminal, whereby interfaces for input devices 130 and output devices 134 are included in the unit or terminal and the anchored connector cables are physically connected to the unit or terminal. In operation, the retail photo kiosk 100 generally provides consumers with a simple, convenient way to print, share, and make photo products and gifts using their personal photographs. FIG. 2 is a flowchart illustrating an exemplary method for using the retail photo kiosk 100. When powered on, the kiosk 100 may sit in an idle or sleep setting until sensing user interaction. Alternatively, the kiosk 100 may be "always on," displaying on the touch screen display 122 an initial user engagement screen. The user engagement screen invites the user to begin an interaction with the kiosk 100.

For example, the kiosk may display, on the touch screen display 122, the following instruction: "Please Connect Your Smartphone to Proper USB Cable on this Photo Kiosk" (step 205). The language of the user engagement screen can vary, but will invite the user to physically connect an input device 130 (e.g., a smartphone) to the kiosk 100 via an anchored connector cable 150.

Next, (step 210) the user will accept the invitation to connect to the kiosk, select the appropriate anchored connector cable 150 and physically connect her device to the kiosk 101. The kiosk's data processing system 110 detects the presence of the particular device connected via the anchored connector cable 150 (step 215). Upon connection, the kiosk 100 may also supply electrical power via the anchored connector cables 150 to the connected device to begin charging the device. After recognizing and processing the presence and connection of the user's device, the kiosk 101 requests user information (step 220). The user information requested may be contact information (e.g., an email address or social media account login verification), account information (e.g., for repeat customers that generate a specific account for the retail store), or device information (e.g., phone number). In one embodiment, as shown at step 220 in FIG. 2, the kiosk 100 requests the user information by presenting the following on the touch screen display 122: "Please Input the Phone Number for Your Connected Smartphone." Following that request, the user (at step 225) provides the requested user information—e.g., the phone number of the connected smartphone. In certain embodiments, the user may provide the requested user information via the GUI of the touch screen display 122 or audibly by voice commands via the audio user interface 124, or by a combination of both.

Once the user information is provided to the kiosk 100, it is processed by the data processing system 110 as a confirmation of the user's desire to establish a secure connection with the kiosk. Accordingly the data processing system 110 generates and sends a message to the user's device, which is connected to the kiosk (step 230). The message comprises a website address (e.g., as a hyperlink or URL). The website address may be accessible by a standard web browser on the user's smartphone and enables the user to connect to the kiosk via that website. The message style and format may conform to the user information provided. For example, if the user provides the phone number of the smartphone connected to the kiosk, the data processing system will configure the message as an SMS or MMS test message and deliver the website address to the user's device in such manner. If, by way of another example, the user provides an email address, the data processing system 110 of the kiosk will configure the message as an email and deliver the website address to the user's email (which the user may retrieve via the user's device).

After the data processing system 110 of the kiosk 100 sends the message, it is received at the user's device, which is connected to the kiosk 100. The user, at that point, may access the message, and the website address contained therein (step 235). For example, the user may click on the hyperlink contained in the message, or, alternatively may copy a URL into a web browser app on the device. Following the website address launches a website on a web browser app on the user's device (step 240). The website connects the user's device to the kiosk 100 via the wireless communication system 170. Through this connection, the user is able to select any one or more images stored on the user device and/or a network cloud storage (step 245).

Thus, in certain embodiments, after the wireless link has been established between the user's device and the kiosk 100, the user gains access to the kiosk 100 through an internet browser app to facilitate the selective exchange of photos and data between the user's device and the kiosk 100. In this way, the user does not have to upload all of the images stored on the user device and/or a network cloud storage to the kiosk 100, or even upload partial renderings of all such images (e.g., thumbnails). The user selects and uploads only those images that they wish to use on the kiosk instead of their entire library of images. This can be particularly advantageous in view of users' massive collections of images and limitations that may exist with cellular or local area network bandwidth. Additionally, the embodiments described prescribe a method in which the user does not have to take any action on the kiosk 100 or on the user device to obtain permissions or adjust security or privacy settings. The link between the kiosk and the user device is a unique, one-time session that grants access to the user device.

Once the user has selected an image or a plurality of images, the user may then leverage the kiosk's further capabilities (step 250). For example, the user may use the kiosk to edit the selected images, to generate renderings of photo products that include the selected photos, to print the selected photos on the output devices 134, and to place orders for photo products to be produced by the kiosk or the retailer. Such images may be incorporated into the kiosk's further capabilities. For example, the user may utilize the kiosk 100 to edit the selected images, to create photo products that include the selected images, to place orders of such photo products to be fulfilled by the kiosk autonomously or by the retail store, and to print the selected images using any one or more of the output devices 134 in the kiosk 100.

The data processing system 110 processes the user's actions and causes the kiosk to take appropriate action (step 255). For example, in response to the user requesting prints, the data processing system 110 causes the appropriate output device 134 (e.g., printer) to print the selected images. In response to the user creating a photo product rendering or placing an order for a photo product, the data processing system 110 causes the necessary output devices 134 to produce the photo product autonomously, or, in the alternative, delivers instructions so that a retail store clerk can produce the photo product. At this step, the data processing system 110 of the kiosk 100 calculates a price for the prints and/or photo product, displays the price to the user via the touch screen display 122, and facilitates receipt of electronic payment from the user (e.g., via an electronic payment device that can be connected to the kiosk 100 as an input device 130). The final step (step 260) in an exemplary operation of the kiosk 100 is for the kiosk 100 to inform the user that the job has been completed and the transaction has been finalized. To do so, the kiosk 100 may display a notice on the touch screen display 122 and/or project an audible message via audio user interface 124. The message may comprise information indicating where the user can retrieve photo prints and/or photo products, and may instruct the user to disconnect the mobile device from the anchored connector cables 150.

Figure 3A:
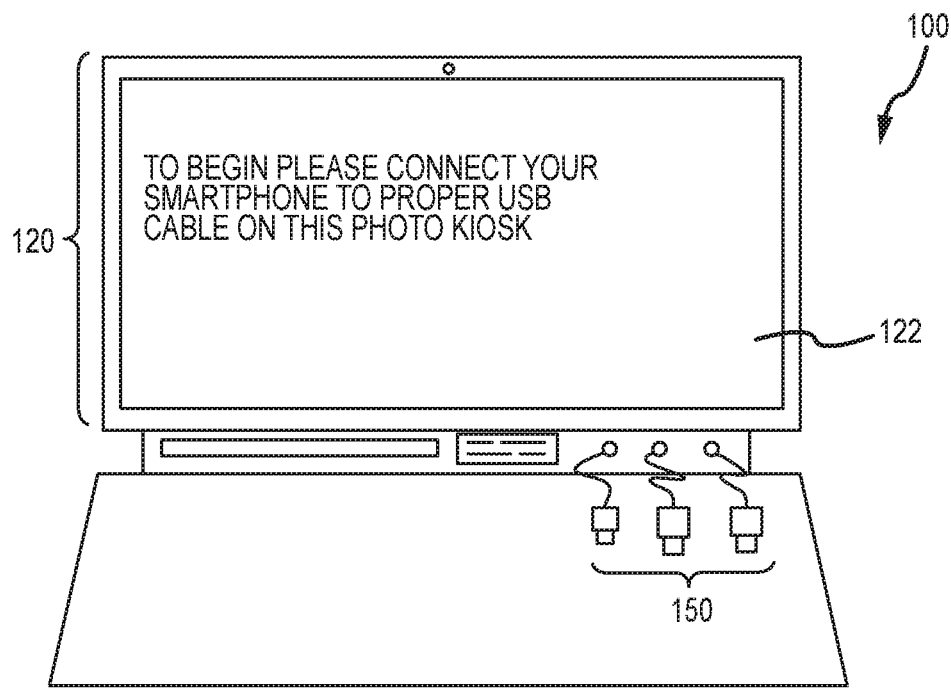
FIG. 3A illustrates an embodiment of the messaging that may be presented on a touchscreen display of a retail photo kiosk to establish access to the retail photo kiosk.
Figure 3B:
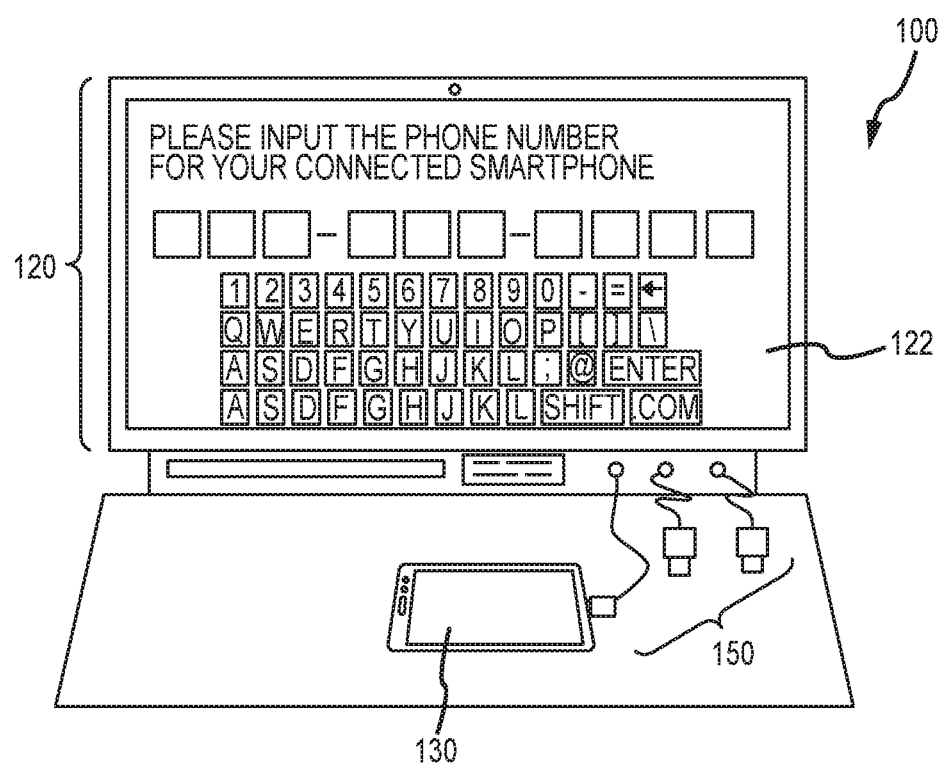
FIG. 3B illustrates an embodiment of a graphical user interface on the retail photo kiosk requesting contact information in order to connect with the user device.
Figure 3C:
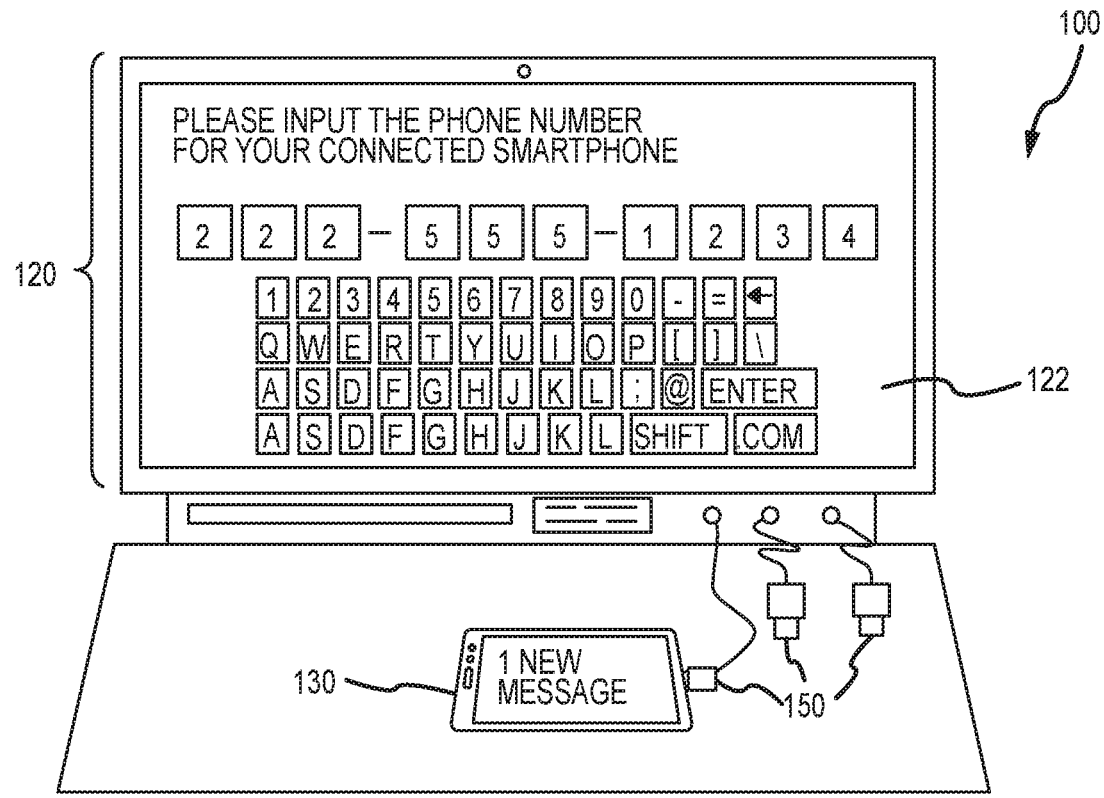
FIG. 3C illustrates an embodiment of a graphical user interface on the retail photo kiosk and a user mobile device indicating that "new message" has been received.
Figure 3D:
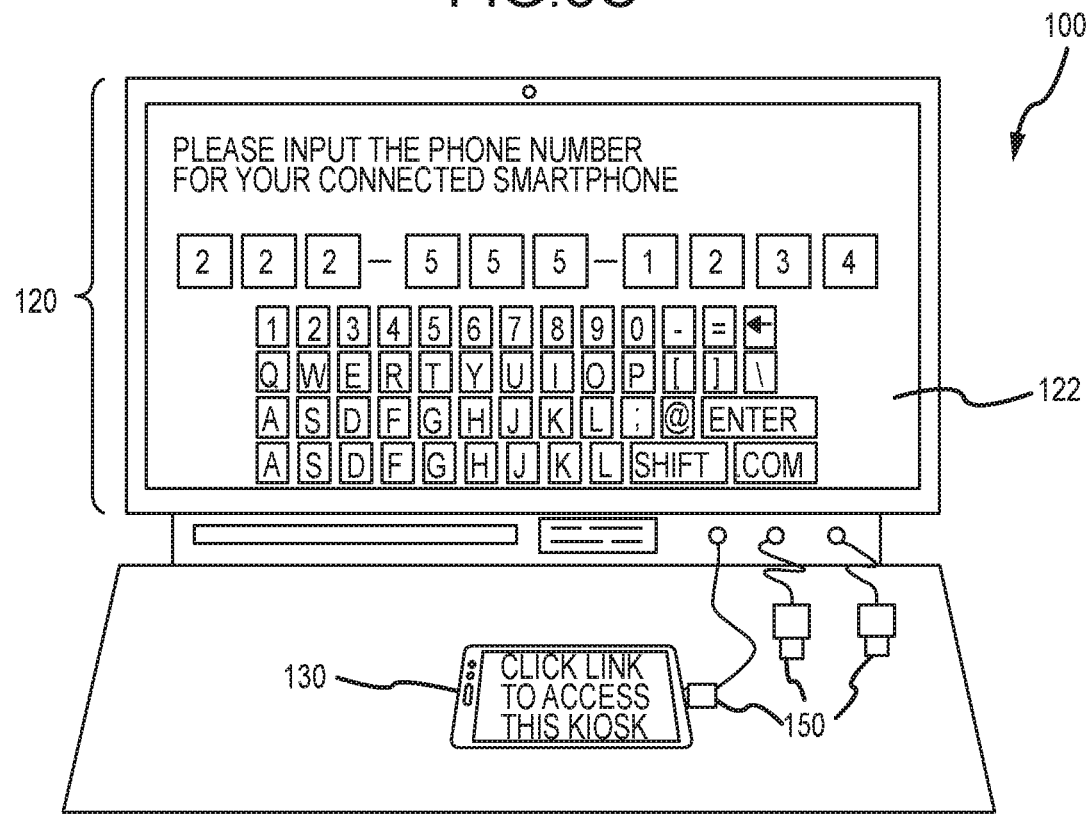
FIG. 3D illustrates an embodiment of a graphical user interface on the retail photo kiosk and a user mobile device presenting a user with a hyperlink to provide access to the kiosk.

FIGS. 3A-3E illustrate an embodiment of the kiosk 100 carrying out a user session, similar to the method outlined in FIG. 2. In FIG. 3A, the kiosk 100 displays on the touch screen display 122 a welcome screen. The welcome screen instructs the user that the first step to initiate a session and gain access to the kiosk 100 is to connect a smartphone (or tablet or other mobile device) to the kiosk 100 using the appropriate anchored connector cable 150. FIG. 3B illustrates the next phase, after which the user has connected a smartphone to the kiosk 100 via an anchored connector cable 150. The kiosk 100 instructs the user to input device information, namely, the phone number for the connected smartphone. The instruction is displayed on the touch screen display 122. FIG. 3C illustrates that the user has responded to the instruction by providing the phone number for the connected smartphone. With this device information, the data processing system 110 generates a message comprising a website address and sends the message to the connected smartphone. The connected smartphone 130 confirms receipt of the message by generating a "1 New Message" notification, as shown in FIG. 3C.

Figure 3E:
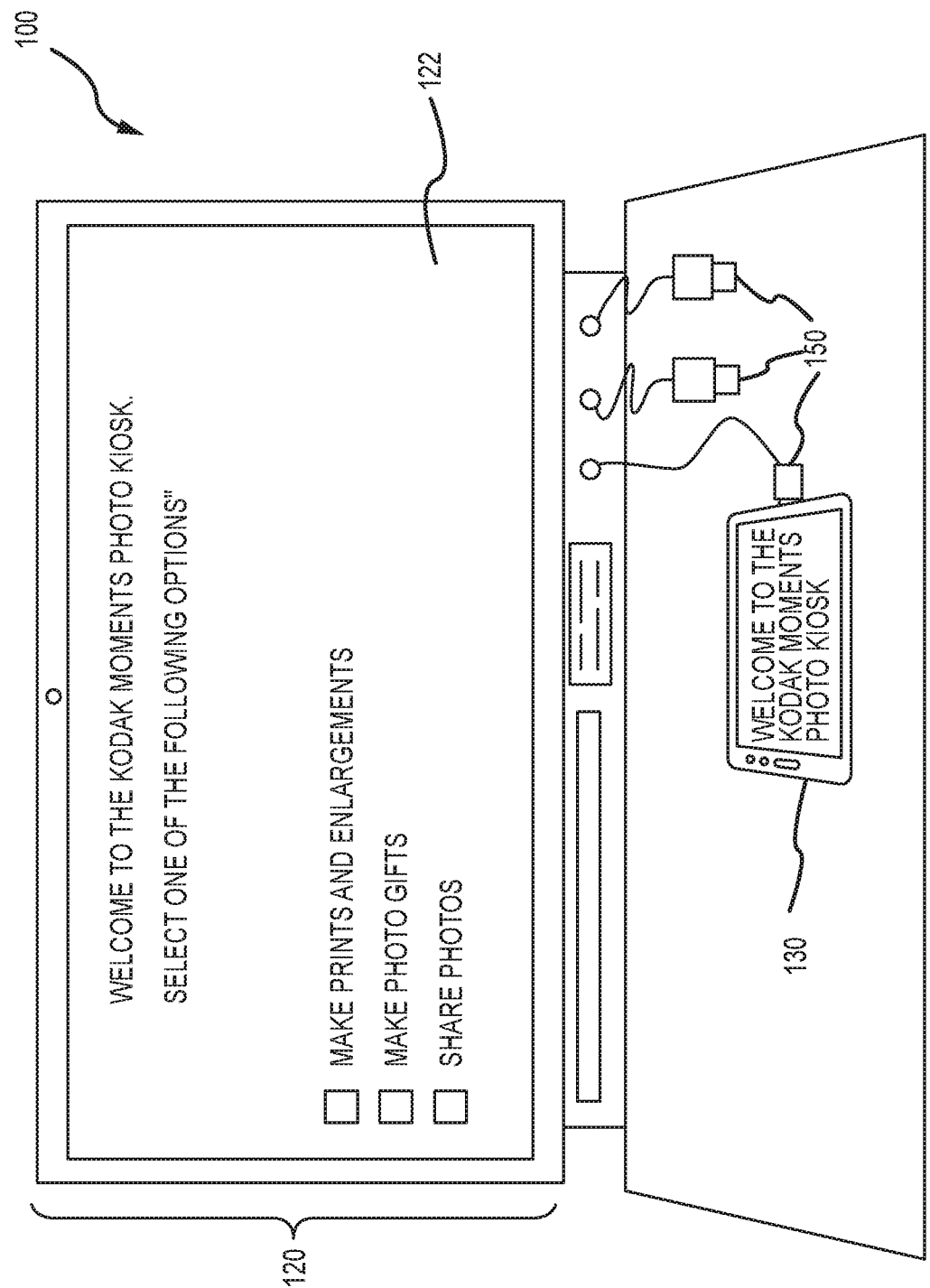
FIG. 3E illustrates an embodiment of a graphical user interface on the retail photo kiosk and a user mobile device, both displaying a welcome message confirming access to the kiosk.

The user opens the message to find that the message contains a hyperlink to the website address corresponding to the kiosk 100. This is shown in FIG. 3C. To gain access to the kiosk 100 and proceed with utilizing the additional photo features of the kiosk, as described previously, the user clicks or selects the hyperlink. The user is then directed to a website that corresponds to the kiosk 100, via a web browser app on the smart phone. At this point, access to the kiosk has been established. The user may proceed to select specific images stored on the smartphone or remote storage (e.g., a network cloud storage) for further processing. As shown in FIG. 3E the kiosk 100 displays on the touch screen display 122 several processing options, including, for example, "Make Prints and Enlargements," "Make Photo Gifts," and "Share Photos." The user may follow engage the touch screen display 122 to pursue any of these (or other) options.

Figure 4A:
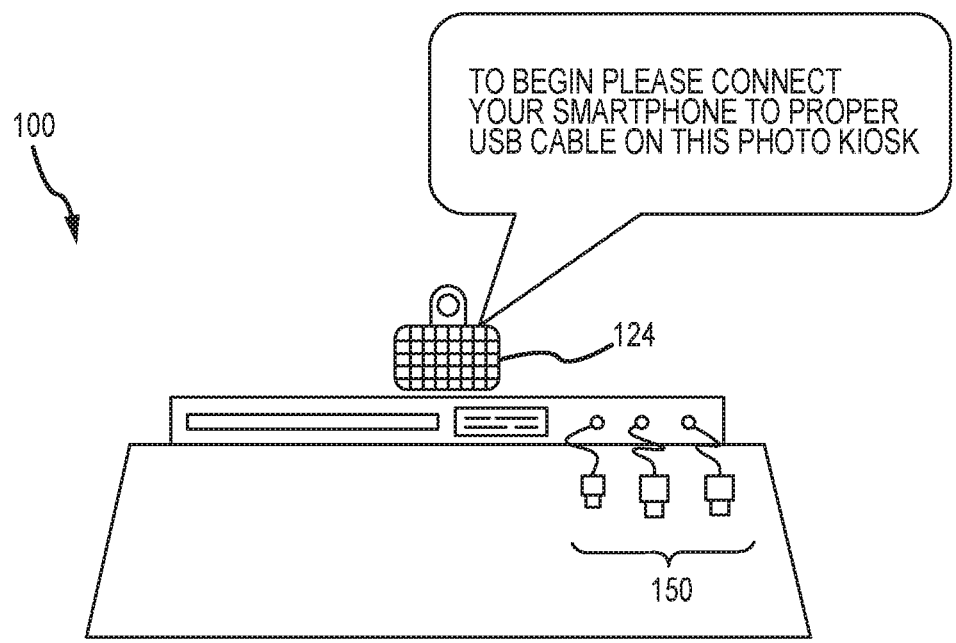
FIG. 4A illustrates an embodiment of the retail photo kiosk projecting audio messaging to initiate an interaction between the kiosk and a potential user to establish access to the retail photo kiosk.
Figure 4B:
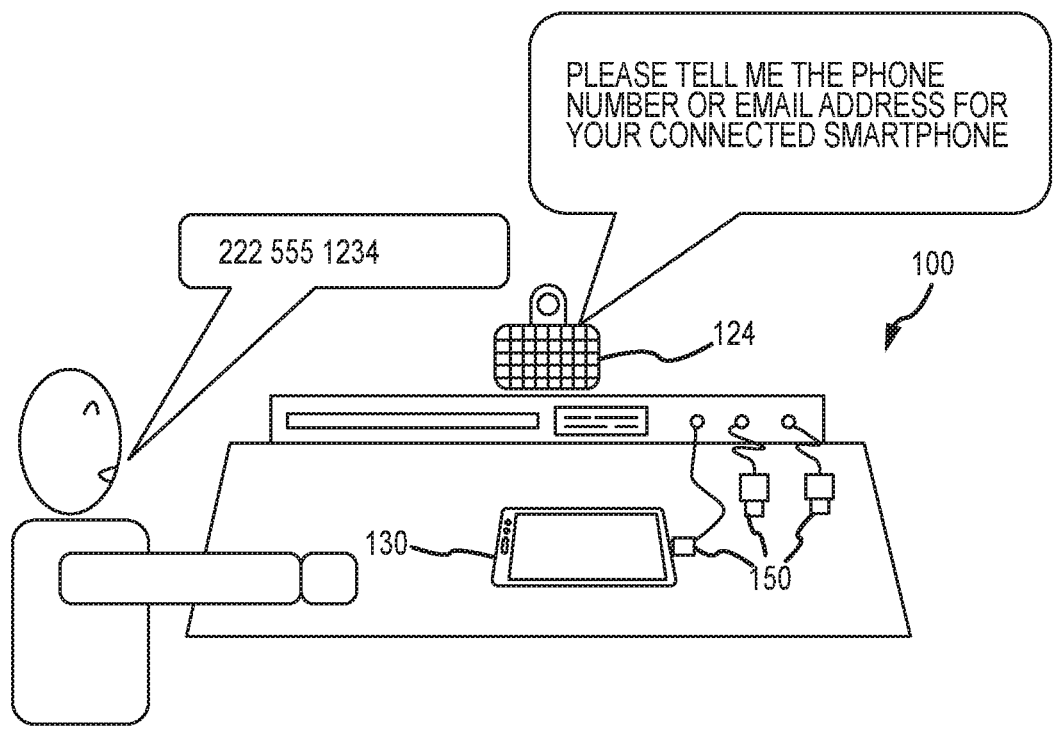
FIG. 4B illustrates an embodiment of the retail photo kiosk with an audio user interface requesting contact information in order to provide access to the user.
Figure 4C:
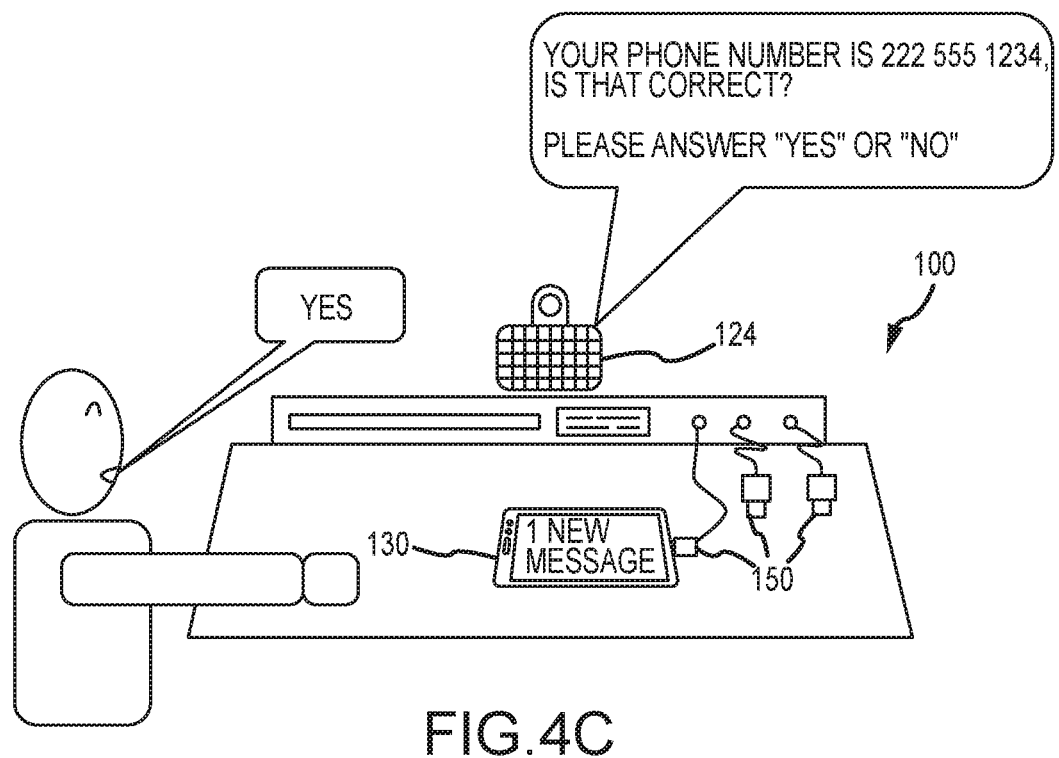
FIG. 4C illustrates an embodiment of the retail photo kiosk with an audio user interface confirming contact information and a user mobile device indicating that a "new message" has been received.
Figure 4D:
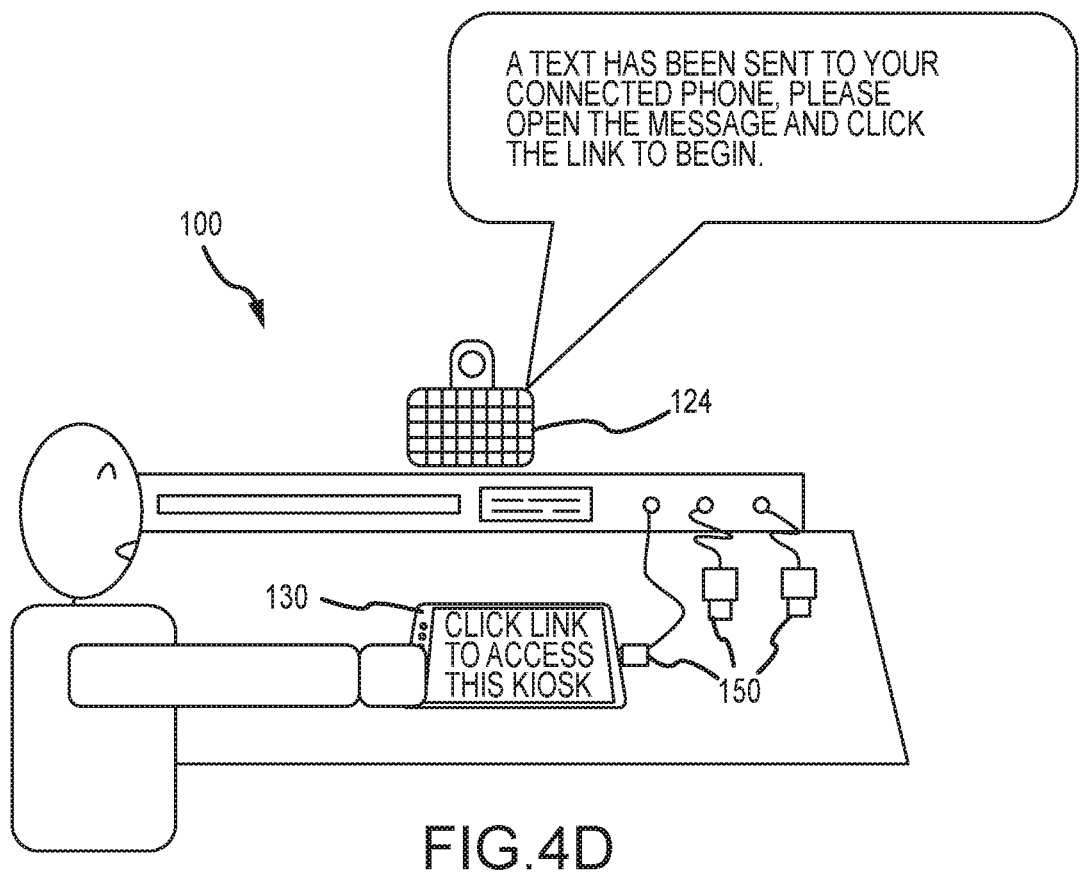
FIG. 4D illustrates an embodiment of the retail photo kiosk with an audio user interface confirming that a message has been sent to a user's mobile device and the mobile device presenting a user with a hyperlink to gain access to the kiosk.

FIGS. 4A-4E illustrate an embodiment of the kiosk 100 carrying out a user session, similar to the method outlined in FIG. 2, but utilizing the audio user interface 124, as opposed to the touch screen display 122. FIG. 4A illustrates the kiosk 100 initiating the user session by audibly instructing the user to connect a smartphone (or other mobile device) to the kiosk 100 via the audio user interface 124. The user, if she desires to initiate a session and gain access to the kiosk, connects a device to the kiosk 100 via the appropriate anchored connector cable 150. Once connected, the kiosk 100 requests user information (e.g., a telephone number or email address) that corresponds to the connected device. As shown in FIG. 4B, the kiosk may issue this request audibly via the audio user interface 124. The user may respond audibly with the requested information, which will be received by the audio user interface 124 and processed by the data processing system 110. To avoid errors, the kiosk 100 may confirm that the user information received is correct. For example, the kiosk 100 may repeat back, audibly, the user information it has received and ask the user to confirm, as shown in FIG. 4C. If the user confirms that the user information received by the kiosk 100 is correct, the data processing system 110 proceeds by creating a message comprising a website address, and sending that message to the device connected to the kiosk 100. The user's device can notify the user of the message by generating a notification, such as "1 New Message," as illustrated in FIG. 4C, and the kiosk 100 can confirm that the message has been sent with an audible notification, as illustrated in FIG. 4D.

Figure 4E:
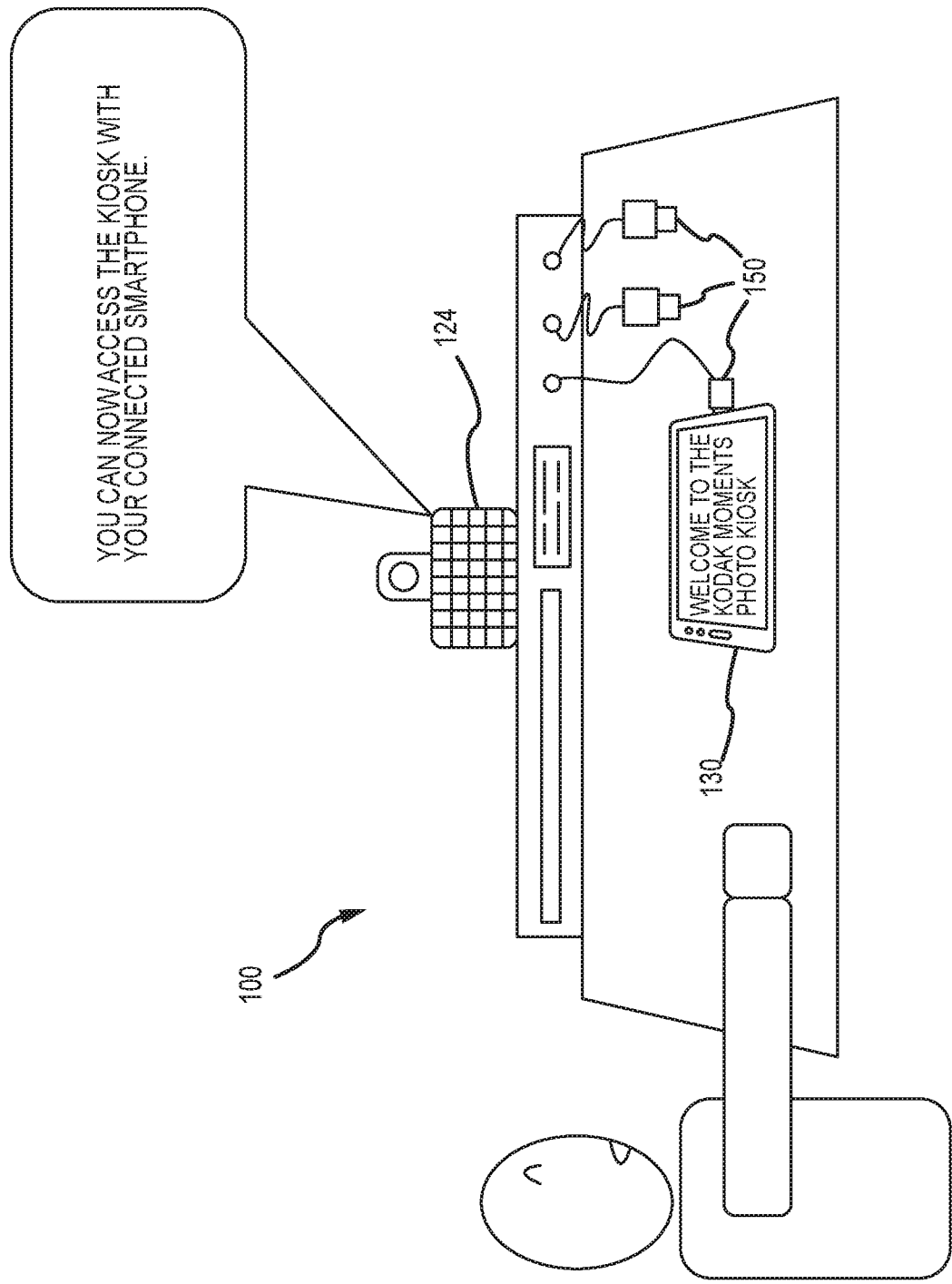
FIG. 4E illustrates an embodiment of the retail photo kiosk with an audio user interface and a user's mobile device, both presenting welcome messages confirming access to the kiosk.

To gain access to the kiosk, the user then opens the message to retrieve the website address (e.g., by clicking on a hyperlink in the message). At this point, access to the kiosk has been established. The kiosk may audibly notify this, as illustrated in FIG. 4E. The user may proceed to select specific images stored on the smartphone or remote storage (e.g., a network cloud storage) for further processing. The kiosk 100 may audibly suggest to the user options for further processing. For example, the kiosk may audibly inquire whether the user desires to make prints of specific images that the user selected on her smartphone via the kiosk website. Or, the kiosk may audibly inquire whether the user desires to make a photo product that incorporates the images that the user has selected on her smartphone.

Certain embodiments for the operation of the photo kiosk 100 are computer-implemented methods. Computer-readable code may be stored in the kiosk 100 (e.g., in data storage system 160) and executed by the data processing system 110 to cause the kiosk to perform the features and functionalities described herein. By way of example, such code is represented by the following sets of exemplary pseudo code.

IMediaDetectionDevice interface code to prepare kiosk 100 to detect a connected mobile device:

IDevice[ ] devs=
    DeviceManager.Instance.GetDevices(typeof(IMediaDetectionDevice));
    _mediaDetection=(IMediaDetectionDevice)devs[0];

Once reference to the media detection device is established, a handler may be attached to its "PTPDetectedEvent" via its IMediaDetectedEvents interface. The following exemplary computer code enables kiosk 100 to respond to a connected mobile device:

IMediaDetectEvents events=_mediaDetection as IMediaDetectEvents;
    if (events !=null)
      events.PTPDetectedEvent+=new
      MediaDetectedEventHandler(events_PTPDEVICEDetectedEvent);

The following exemplary computer code enables kiosk 100 to detect when a mobile device has been connected (e.g., step 215 in FIG. 2):

_mediaDetection.StartMediaDetection(null, "PTPDEVICE");

When the kiosk 100 detects a connected mobile device, it raises its PTPDetectedEvent event which invokes the handler we attached earlier (events_PTPDEVICEDetectedEvent). The handler will stop mobile device detection and trigger the user interface system to provide the appropriate user experience (dialog message, phone number prompt, etc.) (e.g., step 220 and successive steps in FIG. 2). More generally, this set of code overrides the normal PTP protocol and initiates the user interface system.

The invention has been described in detail with particular reference to certain embodiments thereof, but it will be understood that variations and modifications can be effected within the spirit and scope of the invention.

The invention claimed is:

1. A method of establishing dedicated access to a photo kiosk, wherein the photo kiosk comprises a data processing system and a user interface system, the method comprising:
    the data processing system instructing a user, via the user interface system, to physically connect a mobile device to the photo kiosk via an anchored connector cable that is connected to the photo kiosk;
    the data processing system detecting a connection of the mobile device to the photo kiosk via the anchored connector cable;
    the data processing system requesting user information from the user via the user interface system;
    the data processing system receiving the user information;
    the data processing system generating an access message comprising a website address;

the data processing system causing the access message to be sent to the mobile device connected to the photo kiosk via a wireless communication system, wherein the access message is routed to the mobile device based on the user information;

the data processing system granting the mobile device connected to the photo kiosk access to the photo kiosk upon detecting a connection between the mobile device connected to the photo kiosk and a website corresponding to the website address, wherein the user gains access to upload one or more photo images to only the photo kiosk via the website on the mobile device by a unique, one-time session between the photo kiosk and the mobile device connected to the photo kiosk;

the data processing system recognizing the user's selection of the one or more photo images stored on the mobile device connected to the photo kiosk;

the data processing system processing a request to fulfill a photo product order incorporating the one or more photo images, wherein the photo product order is placed by the user via the user interface system; and the data processing system instructing the user, via the user interface system, to physically disconnect the mobile device from the photo kiosk.

2. The method of claim 1, further comprising:
the data processing system presenting to the user, via the user interface system, an option to print the one or more photo images; and
the data processing system causing the one or more photo images to be printed by a printer connected to the photo kiosk.

3. The method of claim 1, wherein the user interface system comprises a touch screen display.

4. The method of claim 1, wherein the user interface system comprises a touch screen display and an audio user interface.

5. The method of claim 1, wherein the anchored connector cable is selected from the group comprising: a Type-A USB cable, a Type-B USB cable, a Type-C USB cable, a mini-USB cable, a micro-USB cable, and a lightning cable.

6. The method of claim 1, wherein the user information comprises an email address, social media login verification, customer account information, or a phone number.

7. The method of claim 1, wherein the access message comprises a hyperlink directed to the website address.

8. The method of claim 1, wherein the user information comprises a phone number associated with the mobile device; and wherein the data processing system causing the access message to be sent to the mobile device comprises the data processing system sending the access message via SMS text message to the phone number associated with the mobile device.

9. A photo kiosk system comprising a data processing system, an audio interface system, and a visual interface system, wherein the photo kiosk is configured to:

use the audio interface system to initiate a user session by audibly instructing a user to connect a mobile device to the photo kiosk;

use the data processing system to recognize when the mobile device is connected to the photo kiosk;

use the audio interface system to audibly request user identification information;

use the data processing system to receive the user identification information;

use the visual interface system to send a visual message comprising a website address to the mobile device connected to the photo kiosk;

use the data processing system to establish a communication link between the photo kiosk and the mobile device connected to the photo kiosk once the website address has been accessed by the mobile device connected to the photo kiosk;

use the audio interface system to audibly confirm the communication link between the photo kiosk and the mobile device connected to the photo kiosk has been established, wherein the user gains access to upload one or more photo images to only the photo kiosk through the mobile device connected to the photo kiosk via the communication link by a unique, one-time session between the photo kiosk and the mobile device connected to photo the kiosk;

use the data processing system to recognize the user's selection of the one or more photo images stored on the mobile device;

use the data processing system to process a request to fulfill a photo print order incorporating the one or more photo images;

use the audio interface system to audibly present photo print order options to the user;

use the audio interface system to audibly receive a photo print order from the user;

use the data processing system to initiate fulfillment of the photo print order by auxiliary printing devices; and use the audio interface system to end the user session by audibly instructing the user to disconnect the mobile device from the photo kiosk.

10. The photo kiosk system of claim 9, wherein the visual interface system comprises a touch screen display.

11. The photo kiosk system of claim 9, wherein the mobile device is connected to the kiosk via an anchored connector cable selected from the group comprising:
a Type-A USB cable, a Type-B USB cable, a Type-C USB cable, a mini-USB cable, a micro-USB cable, and a lightning cable.

12. The photo kiosk system of claim 9, wherein the user identification information comprises an email address, social media login verification, customer account information, or a phone number.

* * * * *